United States Patent [19]

Hughes

[11] 4,190,436
[45] Feb. 26, 1980

[54] AIR MIX AGITATION FOR THE EXTRACTION OF METALS FROM LEACHABLE ORES

[76] Inventor: Robert M. Hughes, 10039 Bristol, Alta Loma, Calif. 91701

[21] Appl. No.: 862,335

[22] Filed: Dec. 20, 1977

[51] Int. Cl.$^2$ ............................................ C22B 11/08
[52] U.S. Cl. .................... 75/105; 75/101 R; 75/118 R; 423/29; 423/31
[58] Field of Search ................. 75/105, 101 R, 118 R; 423/29, 31

[56] References Cited

U.S. PATENT DOCUMENTS

| | | |
|---|---|---|
| 578,089 | 3/1897 | Webb ........................................ 75/105 |
| 840,840 | 1/1907 | Goetschius ............................. 75/105 |
| 1,081,514 | 12/1913 | Reinohl ................................... 75/105 |
| 2,737,438 | 3/1956 | Gaudin .................................. 75/105 X |
| 4,017,309 | 4/1977 | Johnson ............................... 75/101 R |
| 4,080,419 | 3/1978 | Engelmann ......................... 75/101 R |

*Primary Examiner*—G. Ozaki
*Attorney, Agent, or Firm*—Boniard I. Brown

[57] ABSTRACT

Timed or regulated air bursts are employed to agitate and oxygenate leachable ores or other material containing valuable leachable elements in the presence of a leaching solution. The process provides a homogenous mixing of fines within the leaching solution thereby reducing channeling within the ore.

8 Claims, 6 Drawing Figures

AIR MIX AGITATION FOR THE EXTRACTION OF METALS FROM LEACHABLE ORES

BACKGROUND OF THE INVENTION

1. Field of the Invention

This invention relates to the treatment of "ore" (i.e., any leachable material) for the purpose of extracting metals in general and more particularly to the exposure of ore to a leaching solution during a cyanidation metal extraction process.

2. Prior Art

Many metals, particularly precious metals are found in ore or mine dump tailing piles or in sewage treated at sewage plants and must be extracted from this material to be utilized. Conventional ore extraction processes are described in the "Handbook for Prospectors and Operators of Small Mines" by M. W. von Bernewitz, 4th Ed., McGraw Hill Book Company, Inc., pp 3407 et seq.

The most common methods of extracting precious metals, such as gold and silver, from ores are generally referred to as the cyanidization or leaching processes. These processes are carried out by up flow, down flow and percolation of the leaching solution through the ore.

A common disadvantage of these prior art methods is the occurrence of channeling within the fines of the ore over a period of time. As a result the extraction efficiency is reduced.

In order to reduce channeling, various mechanical agitators have been employed to dispense the ore throughout the leaching solution. Among these methods are paddles, movable tanks and flowing fluids such as water and leaching solutions. Each of these agitation methods fail to completely disperse the ore and each require expensive equipment which must be maintained such as pumps, motors, belts, etc.

Another disadvantage of prior art metal extraction processes, which utilize flowing leaching solutions, is the loss of leaching solution over a period of time due to evaporation and excessive aeration of the solution.

THE INVENTION

SUMMARY OF THE INVENTION

An improved process for extracting metals from ore which exhibits the advantages of prior art processes while avoiding the disadvantages of prior art processes has been invented.

An objective of this invention is to provide a process for exposing ore to a leaching solution in an efficient manner which facilitates the extraction of metals from the ore by the solution.

A further objective of this invention is to provide a process for extracting metals from ore which does not require extensive equipment and machinery which must be maintained.

A still further objective of this invention is to provide a process for extracting precious or other metals or elements from ore that increases the yield per pound of ore and conserves the leaching solution employed to extract the metals.

The key to achieving the above-stated objectives is to provide a means of agitating the ore in the presence of the leaching solution that is controllable, inexpensive, and does not over aerate the leaching solution. It has been discovered that timed air bursts injected into a tank, pad, pond or vat containing ore immersed in a leaching solution agitate the ore while increasing the extraction efficiency of the solution. Further, it has been discovered that the provision of air burst during heap leaching processes increases the extraction efficiency of the leaching process. These air bursts also prevent the freezing of the solution in cold weather. Alternatively an air supply which flows through an oxygen scrubber may be utilized which tends to increase the usefulness of the leaching solution and thereby further increases the extraction efficiency of the solution.

This process is very effective when used in a static leaching solution. However, it may also be coupled with up flow, down flow, percolation, or slurry methods of cyanidation as well.

DETAILED DESCRIPTION OF THE INVENTION

An improvement, in the process of extracting previous metal from its ore by cyanidization has been developed. This improvement increases the extraction efficiency of leaching solutions used to separate the precious metals from the ore. The method of this invention may be used in conjunction with conventional up flow, down flow or percolation processes to agitate and oxygenate finely ground ore charges exposed to the dissolving action of cyanidization solutions. When utilized, the method of this invention enhances the leaching action of the cyanidization solutions which are dependent upon the amount of oxygen present and facilitates a thorough exposure of the ore to the leaching solution. All of the above advantages of this invention are achieved without utilizing expensive process equipment.

Basically, the invention involves the use of timed or regulated air bursts to create a churning action which serves to agitate and oxygenate pulverized ore immersed in a cyanidization solution or redistribute channels formed during a heap leaching process as well as oxygentate the heap. It has been discovered that the utilization of intermittent air bursts increases the useful life of the cyanidization solution in that it facilitates the provision of sufficient oxygen to remove the metal from the ore while it precludes the solution from being over oxygenated.

Another advantage of this invention lies in the ability of the timed or controlled air bursts to effectively agitate the ore without producing channeling characteristic of conventional methods of agitating ore in processes such as the up flow and down flow methods.

Figure 1:
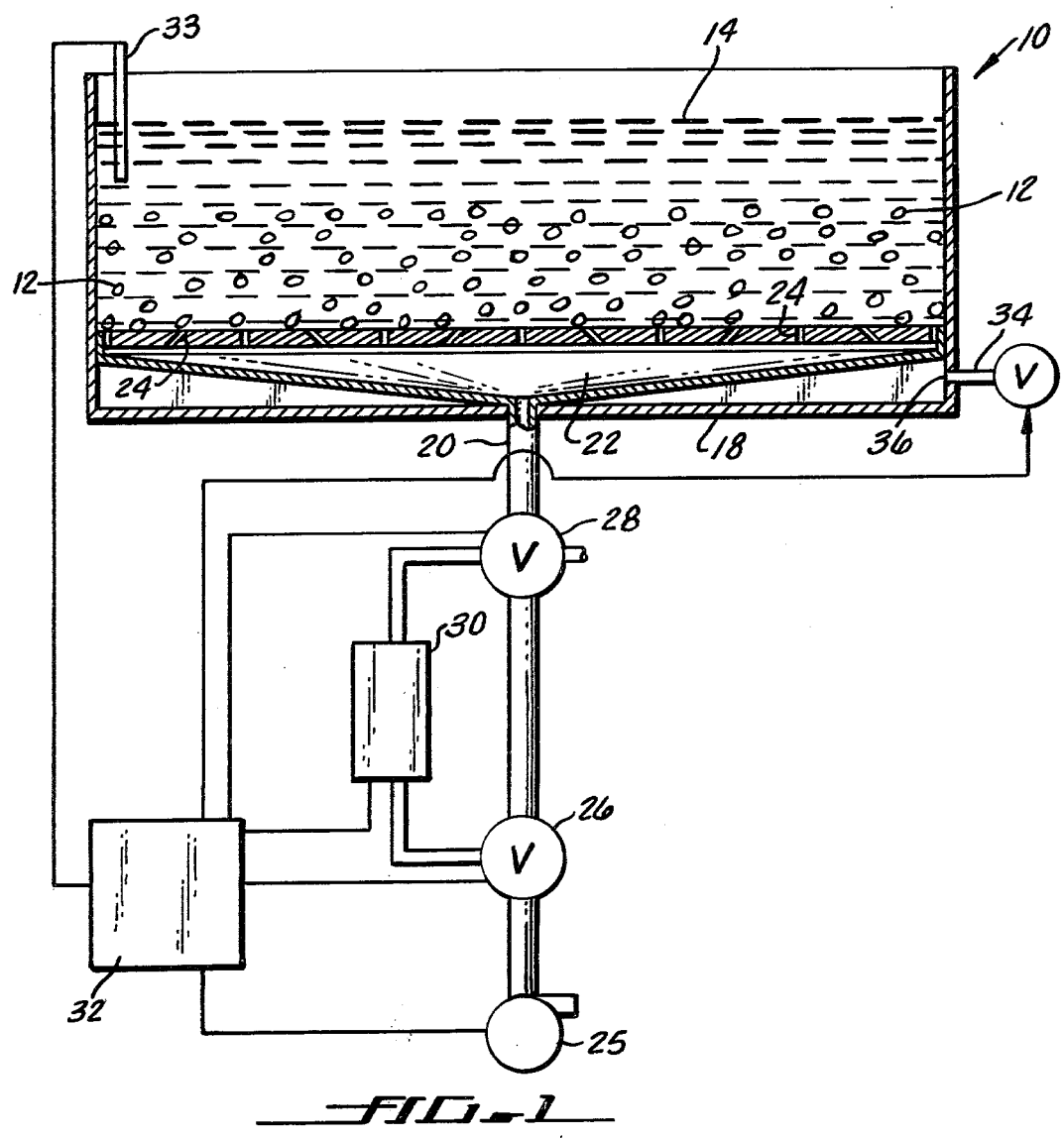
FIG. 1 is a schematic representation of an extraction installation.

This invention may be better understood by referring to FIG. 1 which shows a schematic of a typical metal extraction installation designed to operate in accordance with one embodiment of this process. An ore container 10 charged with ore 12 immersed in a leaching solution 14 is preferably provided with an air distributor 16 (not shown) like that of FIG. 4, preferably located on the bottom 18 of the container 10. The air distributor 16 is provided with an air inlet 20 to a manifold 22 provided with a multiplicity of orifices 24 that form random impingement patterns.

Air is provided to the air distributor 16 by a pump or blower 25, that is connected to the inlet 20 by a series of valves 26 and 28 and/or other process control devices 30, 32 and 33, at a flow rate sufficient to create an air exit pressure from the distributor of approximately four pounds per square inch. This pressure of course will vary according to the bed depth of the material to be processed.

When the air is introduced via timed or controlled bursts, a churning action is produced which causes the ore 12 to become dispersed throughout the leaching solution 14. As a result of this dispersion, and as a result of the introduction of oxygen into the solution by the flow of air, the cyanidization solution leaches the precious metals from the ore in an efficient manner.

When the leaching process has been completed, as determined by assaying the solution periodically, the solution containing the precious metal is drained from the container via an outlet 34 located near the bottom 18 of the container 10 leaving the gangue or mud (ore that no longer has precious metals) along the bottom of the container.

In practice, the container may be fabricated from metal or wood or, in the case of large scale operations, it may be a large pond or pit dug into the ground and lined with a suitable material such as concrete or plastic to preclude the absorption of the leaching solution by the ground and to provide a location above or beneath the lining for the air inlet plumbing associated with the air distribution system.

Figure 2:
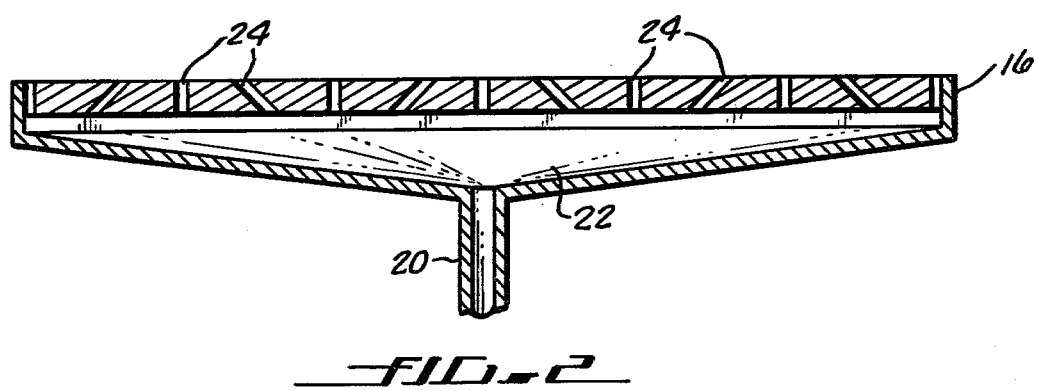
FIG. 2 is a plan view of a complex air distributor.
Figure 3:
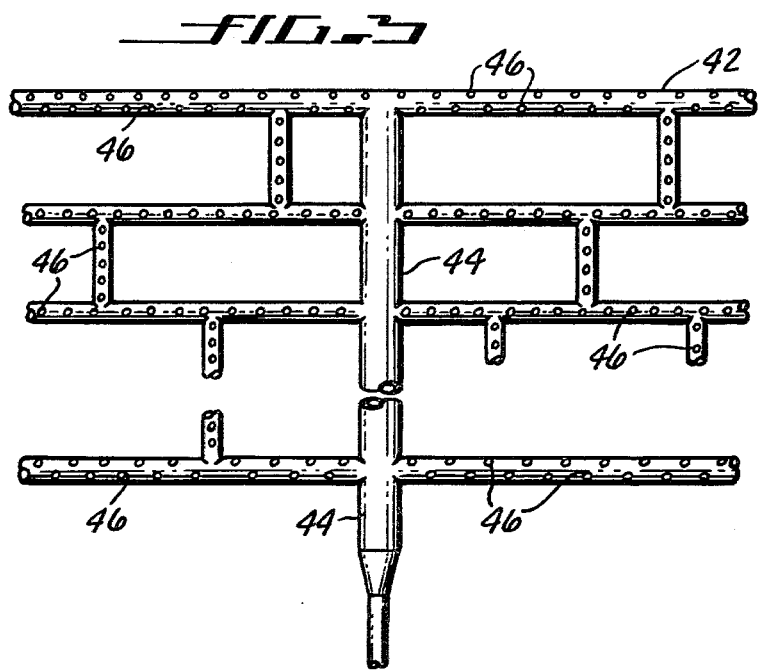
FIG. 3 is a top view of a simplified air distributor.

The air distributor utilized in this invention may be of a complex injector design as shown by the orifice design in FIG. 2 or it may be simply a network of pipes 42 connected by a single manifold 44 that are provided with a multiplicity of apertures 46 that serve as exit points for the air as shown in FIG. 3. The former design would be utilized in smaller installations while the latter would work well in large scale production operations.

Figure 4:
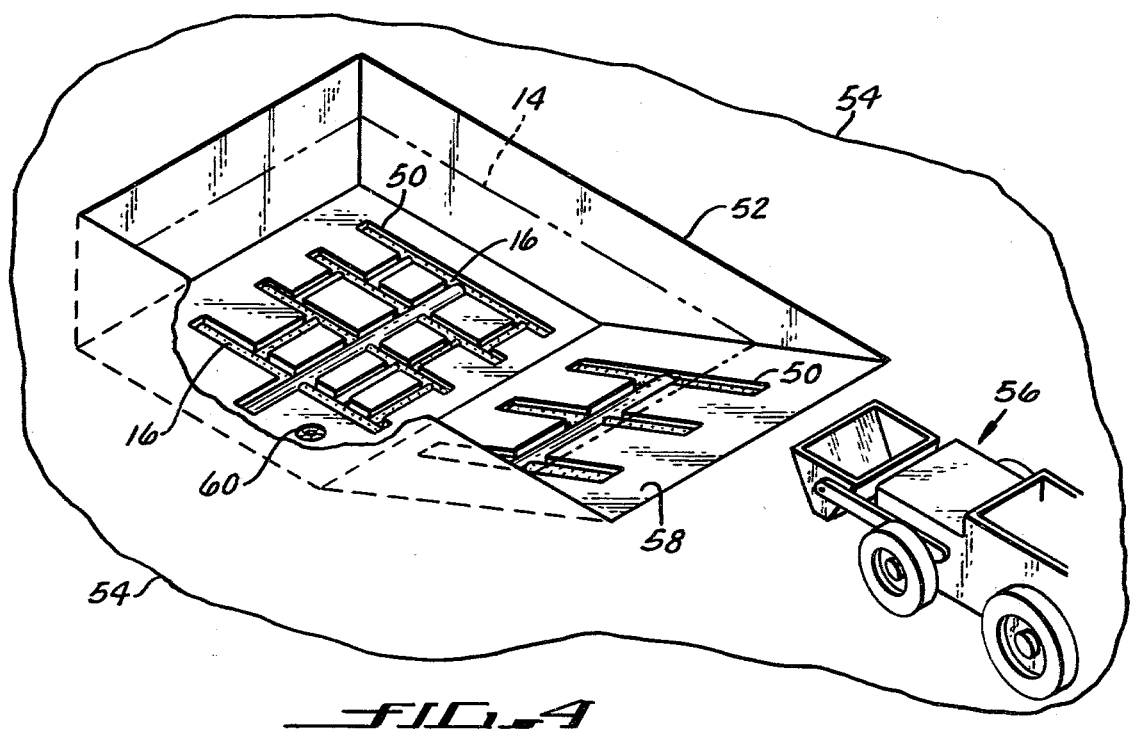
FIG. 4 is a perspective view of an "in ground leach pad."

FIG. 4 is a perspective view of a typical large scale installation set up in the ground. Air distributors 16 are located in trenches 50 provided along the bottom of a pit 52 dug into the ground 54 to prevent it from being crushed by skip loader tires 56 traversing the ramp 58 when ore is transported to and from the pit. The leaching solution 14 is drained from the pit 52 via an outlet 60 connected to pumps (not shown) after it has become pregnant with dissolved metal.

The process as applied in the extraction of gold from its ore with a sodium cyanide leaching solution has proven to be very effective. By monitoring the amount of oxygen in the solution, the air bursts are timed to provide an on/off cycle which precludes over oxygenation. As a further precaution against over oxygenation in those instances where the air burst cycle is lengthened to provide more agitation, the air supply can be routed through a conventional oxygen scrubber (not shown) prior to its introduction into the air distributor.

A preferred application of this invention for the extraction of gold from ore with NaCN is to immerse the pulverized ore in a container having a 0.25% NaCN in $H_2O$ solution (NaCN concentrations of as little as 0.05% may be used). Initiate an air flow into the container at a pressure of approximately four pounds per square inch and maintain the flow for a period of from 2 to 5 minutes. Repeat the air flow cycle every 2 to 5 minutes for a period of from 10 to 30 hours or until complete dissolving of the metal takes place as determined by assaying of the solution. Instead of the periodic bursts as just described the "on time" of the oxygen may be regulated by monitoring the amount of oxygen present in the solution by use of an oxygen monitoring probe which will automatically turn the air on when needed. After typically 24 hours, the gold pregnant cyanide solution is removed from the gange or mud by draining the solution from the tank or container while providing a steady air stream or burst into the container, which greatly facilitates drainage.

Once the gold pregnant solution has been removed, from the ore leachings, the gold may then be precipitated from the solution by conventional methods.

A sample of ore agitated with oxygen infusion, in accordance with the above process, in 2,000 ml of 0.250% NaCN for 24 hours show the following approximate recovery percentages Au-98.92% and Ag-99.9%. These recovery percentages are 8 to 12% greater than that obtained via prior art extractions without oxygen infusion. When the ore was exposed to the process for 12 hours, the recovery percentages were approximately 92.0% and 98.9% respectively.

It should be noted that a KCN solution may be utilized in a process like the foregoing, and that the principles of this process are equally effective for the extraction of other metals such as copper or other elements such as uranium with cyanide solutions or other aqueous solutions such as sulfuric acid where agitation is required and the amount of oxygen present in the extracting solution is determinative of the extraction efficiency.

Figure 5:
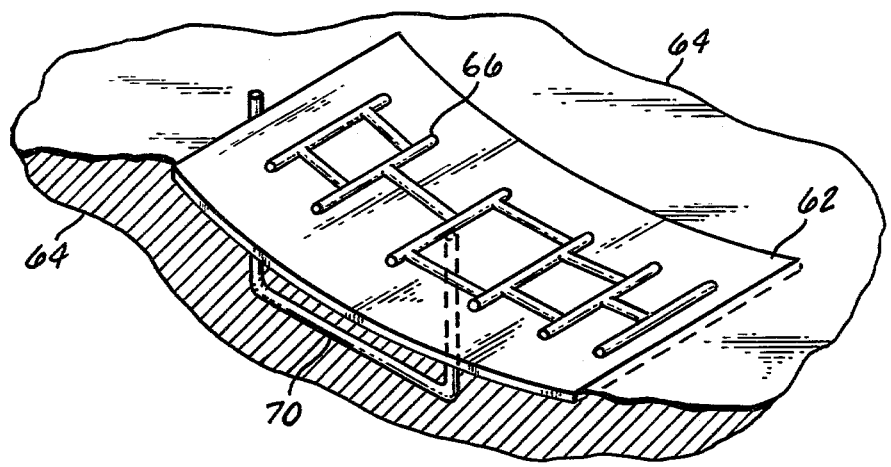
FIG. 5 is a perspective view of a "heap leaching pad" having an air distributor system installed on top of the liner.

Another embodiment of this invention lies in the provision of timed air bursts and/or regulated air flow during a heap leaching process. Referring to FIG. 5, one can readily visualize a pad formed by placing a plastic liner 62 in a slight depression on the ground 64. An air distributor 66 having a configuration similar to that shown in FIG. 3 is placed on top of the liner 62.

Figure 6:
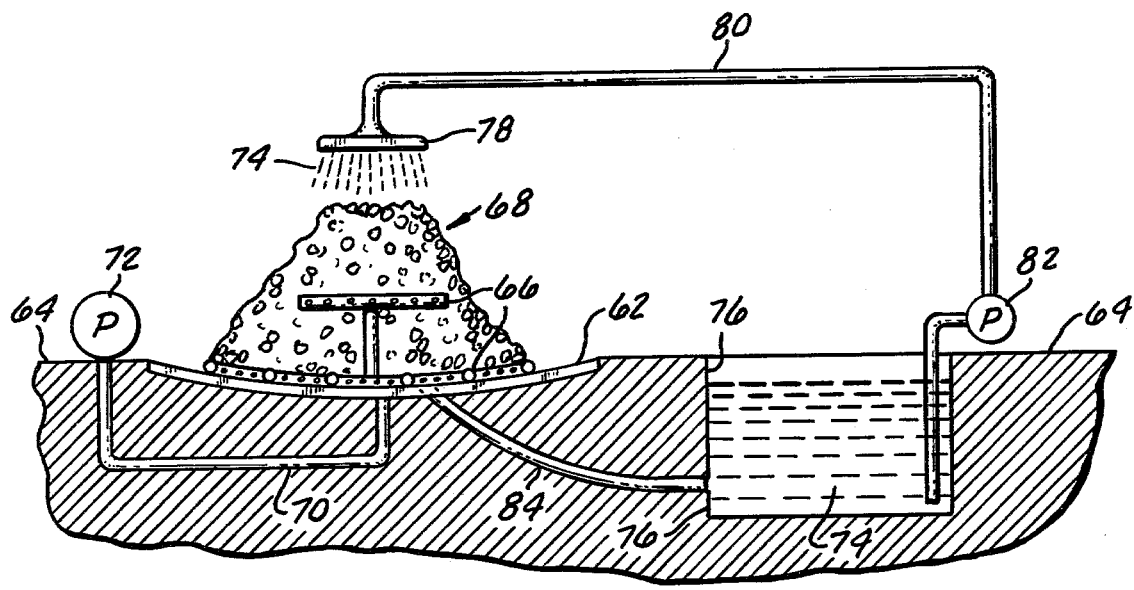
FIG. 6 is a side view of a "heap leaching operation" which shows a schematic of the solution distribution system.

Ore 68 is then piled on top of the air distributor 66 as shown in FIG. 6 to form a "heap." A means for providing air to the distributor is provided by plumbing 70 connected to a pump 72.

A leaching solution 74 is then applied in accordance with prior art heap leaching processes to the top of the ore heap 68, from a settling tank 76 via a sprinkler head 78 connected to a fluid conduit 80 having a fluid pump 82, and allowed to filter down or percolate through the ore to a drain or trough 84, located in the liner 62, leading back to the settling tank 76.

However, unlike prior art processes, the provision of air via the air distributor 66 located at the bottom of the ore pile 68 in cyclic air bursts or a regulated manner in accordance with this invention precludes the formation of a single set of channels throughout the ore pile by the flow of the leaching solution. The air burst provides oxygen within the heap as well as redistributing the ore, thereby causing numerous new channels or solution flow paths to be formed.

As a consequence of the constant redistribution of the flow channels by the flow of the air, more ore is exposed to the leaching action of the percolating solution which significantly increases the extraction efficiency of the process.

For added efficiency, the air distributor system may be layered in multiple tiers throughout the ore heap and orientated to provide air in multiple directions throughout the heap.

Air supplied to a heap extraction process may be scrubbed of oxygen as described above and it may be heated to increase the extraction efficiency. In any case, it has been discovered that the provision of timed air bursts or regulated air flow during a heap leaching process as well as during a conventional vat or pond extraction process results in a significant increase in the extraction efficiency of the leaching solution and produces a greater yield of metal from the ore.

Having completely disclosed my process and how to utilize it to achieve high precious and other metal or element extraction efficiencies, the scope of my claims may now be understood as follows:

I claim:

1. In the art of cyanidization of ore for the extraction of precious or other metals or elements an improved process for extracting such metals or elements from ore or other material wherein the improvement is comprised of, agitating and oxygenating pulverized ore or material immersed within a cyanide or other leaching solution by introducing timed or regulated bursts of air into a container containing said pulverized ore or material and said cyanide or other solution in a cyclic or regulated manner over a period of time ranging from 10 to 30 hours whereby a pregnant solution containing the desired elements or metals will be formed and allowing said solution to drain from said container while providing a continuous flow of air into said solution.

2. The improved process of claim 1 wherein said air bursts are provided during a vat or pad extraction process and said leaching solution is a cyanide solution.

3. The improved process of claim 1 wherein said air bursts are provided during a heap leaching extraction process and said leaching solution is a cyanide solution.

4. The improved process of claim 1 wherein said ore is immersed in a NaCN leaching solution.

5. The process of claim 4 wherein an oxygen probe is utilized to monitor the amount of oxygen introduced into said solution and thereby facilitate an automatic off-on duty cycle for said air bursts.

6. The improved process of claim 1 wherein said ore is immersed in a KCN leaching solution.

7. The process of claim 1 wherein said ore is immersed in a solution that requires the introduction of oxygen to render it active as a leaching solution.

8. An improved method of extracting precious or other metals or elements from ore comprising the steps of:
   (a) providing a container with a cyanide or other leaching solution;
   (b) pulverizing ore and immersing said ore in said solution;
   (c) simultaneously agitating and oxygenating said ore by causing timed or regulated bursts of air to be introduced into said container whereby a churning action is created;
   (d) repeating said agitation and oxygenation step in a cyclic or controlled manner over an extended period of time until said solution is pregnant with said metal or elements; and
   (e) maintaining a steady flow of air into said container while allowing said solution to drain from said container.

* * * * *